US012731243B2

(12) United States Patent
Lim et al.

(10) Patent No.: US 12,731,243 B2
(45) Date of Patent: Sep. 8, 2026

(54) NOZZLE INSPECTION UNIT AND SUBSTRATE TREATMENT APPARATUS INCLUDING THE SAME

(71) Applicant: SEMES CO., LTD., Chungcheongnam-do (KR)

(72) Inventors: Myeong Jun Lim, Gyeonggi-do (KR); Kwang Sup Kim, Chungcheongnam-do (KR); Yeon Chul Song, Seoul (KR); Ji Hoon Yoo, Gyeonggi-do (KR); Jong Min Lee, Gyeonggi-do (KR); Jun Ho Oh, Gyeonggi-do (KR); Young Ho Park, Incheon (KR)

(73) Assignee: SEMES CO., LTD., Chungcheongnam-do (KR)

( * ) Notice: Subject to any disclaimer, the term of this patent is extended or adjusted under 35 U.S.C. 154(b) by 423 days.

(21) Appl. No.: 18/075,412

(22) Filed: Dec. 6, 2022

(65) Prior Publication Data

US 2023/0206424 A1 Jun. 29, 2023

(30) Foreign Application Priority Data

Dec. 28, 2021 (KR) ........................ 10-2021-0189464

(51) Int. Cl.
*G06T 7/00* (2017.01)
*B41J 2/045* (2006.01)
(Continued)

(52) U.S. Cl.
CPC ............. *G06T 7/001* (2013.01); *B41J 2/0451* (2013.01); *B41J 2/04586* (2013.01); *G06T 7/11* (2017.01);
(Continued)

(58) Field of Classification Search
USPC ........................................................ 382/141
See application file for complete search history.

(56) References Cited

U.S. PATENT DOCUMENTS 11,605,003 B2 3/2023 Ki et al.
11,928,810 B2 3/2024 Okada
(Continued)

FOREIGN PATENT DOCUMENTS

CN 113447494 9/2021
KR 10-2006-0112855 11/2006
(Continued)

OTHER PUBLICATIONS

Office Action dated Mar. 18, 2026 for Chinese Patent Application No. 202211531878.9 and its English translation by Google Translate.

(Continued)

*Primary Examiner* — Chineyere Wills-Burns
*Assistant Examiner* — Aaron Timothy Bonansinga
(74) *Attorney, Agent, or Firm* — WOMBLE BOND DICKINSON (US) LLP

(57) ABSTRACT

Provided are a nozzle inspection unit configured to generate a large amount of defect data to improve detection accuracy of a defective nozzle, and a substrate treatment apparatus including the same. The nozzle inspection unit includes: a data collection module configured to collect a plurality of image data related to nozzles; a data classification module configured to classify the plurality of image data according to predefined classes; a data merging module configured to merge good image data related to a normal nozzle and defect image data related to a defective nozzle from among the plurality of image data; a data training module configured to train a plurality of merged image data obtained through the data merging module; and a defect data generation module configured to generate a plurality of final image data from the plurality of merged image data based on the training result.

19 Claims, 9 Drawing Sheets

(51) Int. Cl.
*G06T 7/11* (2017.01)
*G06T 7/187* (2017.01)

(52) U.S. Cl.
CPC .... *G06T 7/187* (2017.01); *G06T 2207/20021* (2013.01); *G06T 2207/20081* (2013.01); *G06T 2207/20221* (2013.01); *G06T 2207/30144* (2013.01); *G06T 2207/30168* (2013.01)

(56) References Cited

U.S. PATENT DOCUMENTS 12,260,548 B2 3/2025 Okada
2007/0182955 A1* 8/2007 Tomita .................. G03F 7/7065 356/237.1
2019/0057499 A1* 2/2019 Dekel-Klein ........ H04N 1/6033
2019/0248153 A1* 8/2019 Muehl .................. H04N 1/4015
2020/0005070 A1* 1/2020 Ambikapathi ...... G06F 18/2413
2021/0031507 A1* 2/2021 Haik ...................... G06V 10/82
2021/0073972 A1* 3/2021 Wu .......................... G06N 3/08
2021/0183036 A1* 6/2021 Gurudath ............... B41J 2/0451
2021/0287353 A1* 9/2021 Soltwedel ........ G01N 21/95607
2021/0304383 A1* 9/2021 Okada ................... B05B 12/084
2021/0312607 A1* 10/2021 Lin ....................... G06F 18/214
2021/0366101 A1* 11/2021 George Boehm, Jr. ..................... G06T 7/0004
2022/0234064 A1* 7/2022 Bremer ................... B05B 12/08
2022/0270360 A1* 8/2022 Mendlovic ............. G06V 40/40
2022/0281177 A1* 9/2022 Gu ......................... G06N 3/045
2022/0309634 A1* 9/2022 Atwood ................. G06V 10/82
2022/0374720 A1* 11/2022 Qu ......................... G06N 3/088
2023/0004814 A1* 1/2023 Cai ........................ B41J 29/393
2023/0073418 A1* 3/2023 Chhaya .................. B33Y 10/00
2023/0264483 A1* 8/2023 Levant ................... G06N 3/045 347/19
2024/0095983 A1* 3/2024 Goodwin ................ G06T 11/60

FOREIGN PATENT DOCUMENTS

KR 10-2016-0083055 7/2016
KR 10-2019-0021967 3/2019
KR 10-2021138 9/2019

OTHER PUBLICATIONS

Notice of Allowance dated Apr. 16, 2025 for Korean Patent Application No. 10-2021-0189464 and its English translation from Global Dossier.

* cited by examiner

FIG. 10

NOZZLE INSPECTION UNIT AND SUBSTRATE TREATMENT APPARATUS INCLUDING THE SAME

CROSS-REFERENCE TO RELATED APPLICATION

This application claims priority from Korean Patent Application No. 10-2021-0189464 filed on Dec. 28, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a nozzle inspection unit and a substrate treatment apparatus including the same. More particularly, the present disclosure relates to a nozzle inspection unit for inspecting a nozzle for jetting droplets onto a substrate, and a substrate treatment apparatus including the same.

2. Description of the Related Art

When a printing process (for example, RGB patterning) is performed on a transparent substrate to fabricate display devices, such as liquid crystal display (LCD) panels, plasma display panels (DPDs), and light emitting diode (LED) panels, printing process equipment provided with an inkjet head module may be used.

SUMMARY

When a printing process is performed on a substrate by using an inkjet head unit, a plurality of nozzles installed in the inkjet head unit may be frequently inspected in an effort to prevent mass production of numerous defective substrates. In this case, a droplet jetted onto the substrate by the nozzle may be inspected, and the droplet may be inspected using image data obtained by a camera module installed in printing equipment.

In this regard, in order to measure and classify defects of the nozzles, a large quantity of defect data associated with the state of the nozzles is required. However, it is difficult to obtain a large amount of defect data since the defect data less frequently occur and is difficult to confirm as compared to normal data.

Aspects of the present disclosure provide a nozzle inspection unit configured to generate a large amount of defect data to improve the detection accuracy of a defective nozzle and a substrate treatment apparatus including the same.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a nozzle inspection unit including: a data collection module configured to collect a plurality of image data related to nozzles; a data classification module configured to classify the plurality of image data according to predefined classes; a data merging module configured to merge good image data related to a normal nozzle and defect image data related to a defective nozzle from among the plurality of image data; a data training module configured to train a plurality of merged image data obtained through the data merging module; and a defect data generation module configured to generate a plurality of final image data from the plurality of merged image data based on the training result.

The final image data may be image data related to a defect of the nozzle.

The nozzle inspection unit may generate a number of the final image data greater than a reference number from a number of the defect image data smaller than the reference number.

The data training module may obtain fake image data similar to the merged image data by training the merged image data.

The data training module may obtain the fake image data using a generative adversarial network (GAN).

The defect data generation module may remove fake image data similar to the merged image data from the plurality of merged image data and generate the final image data based on the remaining merged image data.

The data merging module may segment the good image data into regions and then merge the defect image data into the good image data based on the segmented region.

The data merging module may merge the good image data and the defect image data by taking into account a rotation angle of the defect image data.

The data merging module may segment the good image data into regions, then rotate the defect image data based on the segmented region, and merge the defect image data into the good image data while matching centers of the segmented regions of the defect image data and the good image data.

The defect image data may be smaller than the good image data.

The plurality of image data may include the good image data and the defect image data, or may include the good image data only.

The data classification module may classify the plurality of image data into the good image data and the defect image data.

The data classification module may classify the plurality of image data according to the classes and then classify the image data included in each of the classes into the good image data and the defect image data, or may classify the plurality of image data into the normal image data and the defect image data and then classify each of the normal image data and the defect image data according to the classes.

When the plurality of image data include only the normal image data, the nozzle inspection unit may further include a data acquisition module configured to provide the defect image data.

The nozzle inspection unit may utilize the final image data in determining a defect of the nozzle.

The nozzle inspection unit may further include: a data processing module configured to, when the image data of the substrate is obtained, process the image data of the substrate; a reference data detection module configured to detect reference data; a data analysis module configured to compare and analyze the image data of the substrate and the reference data; and a nozzle determination module configured to determine whether the nozzle is in a good condition or defective based on the analysis between the image data of the substrate and the reference data.

The reference data detection module may determine a class related to the image data of the substrate from among the predefined classes and detect the reference data from among training data included in the determined class.

According to another aspect of the present disclosure, there is provided a nozzle inspection unit including: a data collection module configured to collect a plurality of image data related to nozzles; a data classification module configured to classify the plurality of image data according to predefined classes; a data merging module configured to merge good image data related to a normal nozzle and defect image data related to a defective nozzle from among the plurality of image data; a data training module configured to train a plurality of merged image data obtained through the data merging module; and a defect data generation module configured to generate a plurality of final image data from the plurality of merged image data based on the training result, wherein the nozzle inspection unit generates a number of the final image data greater than a reference number from a number of the defect image data smaller than the reference number, the data merging module merges the good image data and the defect image data by taking into account a rotation angle of the defect image data, the data training module obtains fake image data similar to the merged image data by training the merged image data, wherein the data training module obtains the fake image data using a GAN, and the defect data generation module removes the fake image data similar to the merged image data from the plurality of merged image data and generates the final image data based on the remaining merged image data.

According to another aspect of the present disclosure, there is provided a substrate treatment apparatus including: a process processing unit configured to support a substrate while the substrate is treated; an inkjet head unit including a plurality of nozzles and configured to jet a substrate processing liquid onto the substrate using the nozzles; a gantry unit having the inkjet head unit installed thereon and configured to move the inkjet head unit on the substrate; and a nozzle inspection unit configured to inspect the nozzles, wherein the nozzle inspection unit includes a data collection module configured to collect a plurality of image data related to the nozzles; a data classification module configured to classify the plurality of image data according to predefined classes; a data merging module configured to merge good image data related to a normal nozzle and defect image data related to a defective nozzle from among the plurality of image data; a data training module configured to train a plurality of merged image data obtained through the data merging module; and a defect data generation module configured to generate a plurality of final image data from the plurality of merged image data based on the training result.

The substrate treatment apparatus may perform pixel printing on the substrate.

BRIEF DESCRIPTION OF THE DRAWINGS

The above and other aspects and features of the present disclosure will become more apparent by describing in detail exemplary embodiments thereof with reference to the attached drawings, in which:

FIG. 10 is a flowchart illustrating a nozzle inspection method performed by a nozzle inspection unit included in a substrate treatment apparatus according to an embodiment of the present disclosure.

DETAILED DESCRIPTION OF THE EMBODIMENTS

Figure 1:
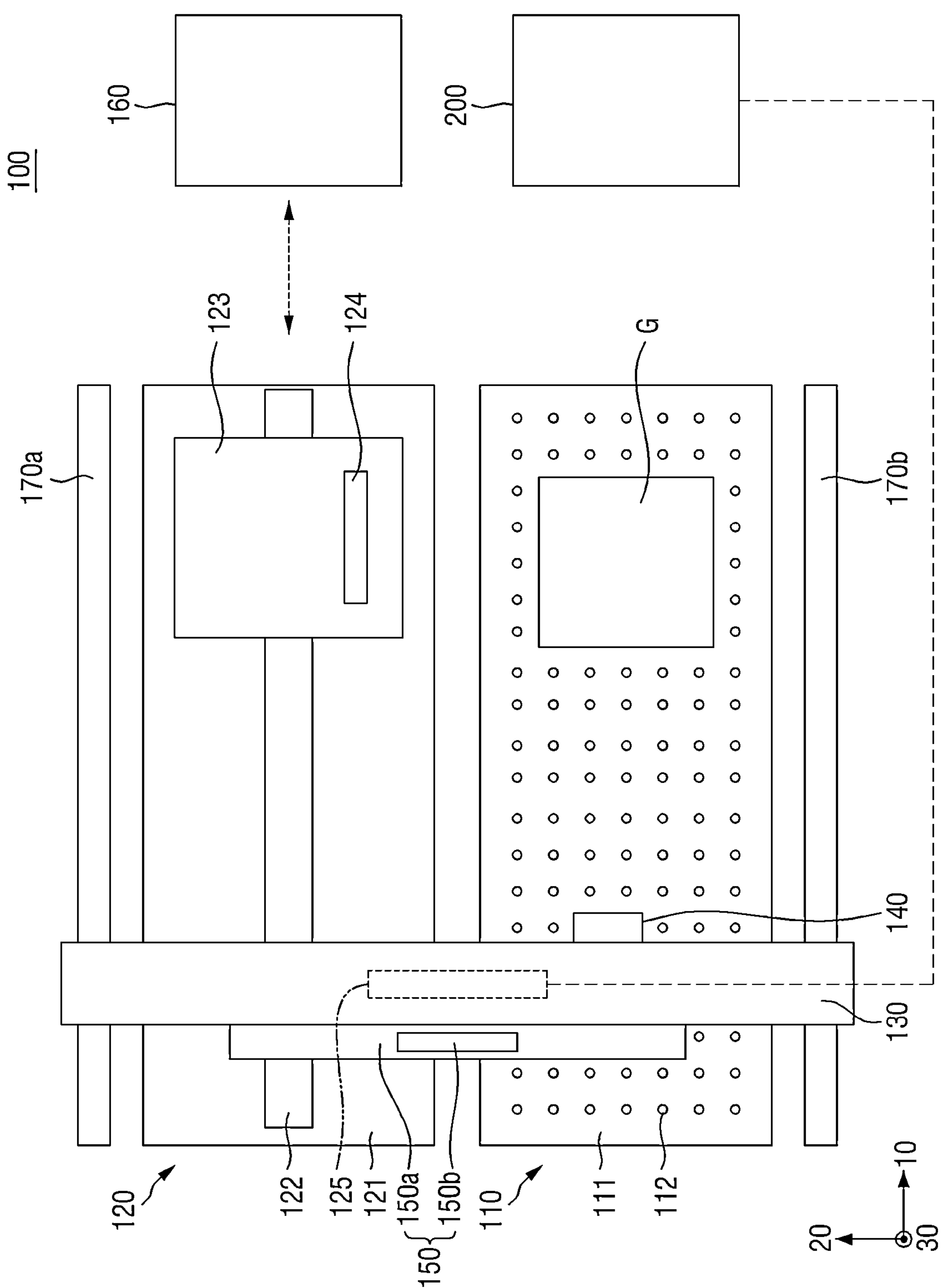
FIG. 1 is a diagram schematically illustrating an internal structure of a substrate treatment apparatus according to an embodiment of the present disclosure.

Hereinafter, preferred embodiments of the present disclosure will be described in detail with reference to the accompanying drawings. Advantages and features of the present disclosure and methods of accomplishing the same may be understood more readily by reference to the following detailed description of preferred embodiments and the accompanying drawings. The present disclosure may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated components, steps, operations, and/or elements, but do not preclude the presence or addition of one or more other components, steps, operations, and/or elements.

Unless defined otherwise, all technical and scientific terms used herein have the same meaning as commonly understood by one of ordinary skill in the art to which this invention belongs. Further, unless defined otherwise, all terms defined in generally used dictionaries may not be overly interpreted.

Hereinafter, exemplary embodiments of the present disclosure will be described in detail with reference to the accompanying drawings. In the description with reference to the drawings, the same or corresponding elements are denoted by the same reference numerals, and a redundant description thereof will be omitted.

The present disclosure relates to a nozzle inspection unit configured to inspect a nozzle based on substrate image data in which a state of the nozzle can be analyzed, and a substrate treatment apparatus including the nozzle inspection unit. The nozzle inspection unit will be described in detail further below, and the substrate treatment apparatus will be first described.

FIG. 1 is a diagram schematically illustrating an internal structure of a substrate treatment apparatus according to an embodiment of the present disclosure.

A substrate treatment apparatus 100 may treat a substrate G (e.g., glass substrate) for use in fabricating a display device. The substrate treatment apparatus 100 may be provided as inkjet equipment configured to print the substrate G by jetting a substrate processing liquid onto the substrate G by means of an inkjet head unit 140.

The substrate treatment apparatus 100 may use ink as the substrate processing liquid. Here, the substrate processing liquid refers to a chemical solution used in a printing process of the substrate G. The substrate processing liquid may be, for example, quantum dot (QD) ink containing ultrafine semiconductor particles, and the substrate treatment apparatus 100 may be provided as QD color filter (CF) inkjet equipment. The substrate treatment apparatus 100 may perform pixel printing (PT) on the substrate G using the substrate processing liquid, and may be provided as inkjet equipment employing a circulation system to prevent the nozzles from being clogged by the substrate processing liquid.

Referring to FIG. 1, the substrate treatment apparatus 100 may be configured to include a process processing unit 110, a maintenance unit 120, a gantry unit 130, an inkjet head unit 140, a substrate processing liquid supply unit 150, a controller 160, and a nozzle inspection unit 200.

The process processing unit 110 may support the substrate G while a printing (PT) operation is performed on the substrate G. Here, the PT operation refers to a printing process of the substrate G using a substrate processing liquid.

The process processing unit 110 may support the substrate G in a non-contact manner. The process processing unit 110 may support the substrate G by, for example, levitating the substrate G using air. However, the present embodiment is not limited thereto. The process processing unit 110 may support the substrate G in a contact manner. The process processing unit 110 may support the substrate G using, for example, a support member provided with a receiving surface at an upper portion thereof The process processing unit 110 may move the substrate G while supporting the substrate G using air. The process processing unit 110 may be configured to include, for example, a first stage 111 and an air hole 112.

The first stage 111 may be provided as a base so that the substrate G can be seated thereon. The air hole 112 may be formed passing through an upper surface of the first stage 111, and may be provided in plural number in a printing zone on the first stage 111.

The air hole 112 may inject air toward the upper portion of the first stage 111 (in a third direction 30). In so doing, the air hole 112 can levitate the substrate G received on the first stage 111.

Although not shown in FIG. 1, the process processing unit 110 may further include a gripper and a guide rail. The gripper may hold the substrate G to prevent the substrate G from being dislodged from the first stage 111 when the substrate G is moved along a longitudinal direction (first direction 10) of the first stage 111. When the substrate G is moved, the gripper may move in the same direction as the substrate G along the guide rail while holding the substrate G. The gripper and the guide rail may be provided outside the first stage 111.

The maintenance unit 120 may measure a jetted position (i.e., hitting position) of the substrate processing liquid on the substrate G and whether the substrate processing liquid is jetted. The maintenance unit 120 may measure the jetted position of the substrate processing liquid and whether the substrate processing liquid is jetted for each of the plurality of nozzles provided in the inkjet head unit 140, and may provide the obtained measurement results to the controller 160.

The maintenance unit 120 may be configured to include, for example, a second stage 121, a third guide rail 122, a first plate 123, a calibration board 124, and a vision module 125.

The second stage 121 may serve as a base as in the first stage 111 and be arranged in parallel to the first stage 111. The second stage 121 may include a maintenance zone at an upper portion thereof. The second stage 121 may have the same size as that of the first stage 111, but may have a smaller or larger size than that of the first stage 111.

The third guide rail 122 may guide a moving path of the first plate 123. The third guide rail 122 may be provided as at least one line on the second stage 121 along the longitudinal direction (first direction 10) of the second stage 121. The third guide rail 122 may be implemented with, for example, a linear motor (LM) guide system.

Although not shown in FIG. 1, the maintenance unit 120 may further include a fourth guide rail. The fourth guide rail may guide the moving path of the first plate 123 as in the third guide rail 122, and may be provided as at least one line on the second stage 121 along the width direction (second direction 20) of the second stage 121.

The first plate 123 may move on the second stage 121 along the third guide rail 122 and/or the fourth guide rail. The first plate 123 may move in parallel to the substrate G along the third guide rail 122, and may move close to or away from the substrate G along the fourth guide rail.

The calibration board 124 may measure the jetted position of the substrate processing liquid on the substrate G. The calibration board 124 may include an alignment mark, a graduated ruler, and the like, be installed on the first plate 123, and be arranged along the longitudinal direction (first direction 10) of the first plate 123.

The vision module 125 may include a camera module and obtain image information of the substrate G. The image information of the substrate G obtained by the vision module 125 may include information on whether the substrate processing liquid is jetted, the jetted position of the substrate processing liquid, a jetting amount of the substrate processing liquid, and the area over which the substrate processing liquid is jetted, etc. Meanwhile, the vision module 125 may obtain information on the calibration board 124 along with the image information of the substrate G onto which the substrate processing liquid is jetted, and provide the obtained information.

When the substrate G is treated, the vision module 125 may obtain the image information of the substrate G in real time. The vision module 125 may obtain the image information by photographing the substrate Gin the longitudinal direction (first direction 10), and in this case, the vision module 125 may be configured to include a line scan camera. In addition, the vision module 125 may obtain the image information by photographing the substrate G for each region having a predetermined size. In this case, the vision module 125 may be configured to include an area scan camera.

The vision module 125 may be attached to a bottom surface or a side surface of the gantry unit 130 to obtain the image information of the substrate G onto which the substrate processing liquid is jetted. However, the present embodiment is not limited thereto. The vision module 125 may be attached to a side surface of the inkjet head unit 140. Meanwhile, at least one single vision module 125 may be provided in the substrate treatment apparatus 100, and may be fixedly or movably installed in the substrate treatment apparatus 100.

The gantry unit 130 may support the inkjet head unit 140. The gantry unit 130 may be provided at upper portions of the first stage 111 and the second stage 121 so that the inkjet head unit 140 can jet the substrate processing liquid onto the substrate G.

The gantry unit 130 may be provided on the first stage 111 and the second stage 121 by using the width direction (second direction 20) of the first stage 111 and the second stage 121 as a longitudinal direction. The gantry unit 130 may move in the longitudinal direction (first direction 10) of the first stage 111 and the second stage 121 along a first guide rail 170*a* and a second guide rail 170*b*. The first guide rail 170*a* and the second guide rail 170*b* may be provided outside the first stage 111 and the second stage 121 along the longitudinal direction (first direction 10) of the first stage 111 and the second stage 121.

Although not shown in FIG. 1, the substrate treatment apparatus 100 may further include a gantry moving unit. The gantry moving unit may slide the gantry unit 130 along the first guide rail 170*a* and the second guide rail 170*b*. The gantry moving unit may be installed in the gantry unit 130.

The inkjet head unit 140 may eject the substrate processing liquid in the form of droplets onto the substrate G. The inkjet head unit 140 may be installed on a side surface or bottom surface of the gantry unit 130.

At least one inkjet head unit 140 may be installed on the gantry unit 130. When a plurality of inkjet head units 140 are installed on the gantry unit 130, the plurality of inkjet head units 140 may be installed in parallel along the longitudinal direction (second direction 20) of the gantry unit 130. In addition, the plurality of inkjet head units 140 may operate independently of each other, or operate uniformly.

The inkjet head unit 140 may move along the longitudinal direction (second direction 20) of the gantry unit 130 so as to be located at a desired position on the substrate G. However, the present embodiment is not limited thereto. The inkjet head unit 140 may move along the height direction (third direction 30) of the gantry unit 130, and may also rotate a clockwise direction or counterclockwise direction.

Meanwhile, the inkjet head unit 140 may be fixedly installed on the gantry unit 130. In this case, the gantry unit 130 may be movably provided.

Although not shown in FIG. 1, the substrate treatment apparatus 100 may further include an inkjet head moving unit. The inkjet head moving unit may linearly move or rotate the inkjet head unit 140.

Although not shown in FIG. 1, the inkjet head unit 140 may be configured to include a nozzle plate, a plurality of nozzles, a piezoelectric element, and the like. The nozzle plate constitutes a body of the inkjet head unit 140. The plurality (128, 256, or the like) of nozzles may be arranged in multiple rows and multiple columns at a predetermined interval on a lower portion of the nozzle plate, and a number of piezoelectric elements may be provided corresponding to the number of nozzles in the nozzle plate. When the inkjet head unit 140 is configured as described above, the inkjet head unit 140 may eject the substrate processing liquid onto the substrate G through the nozzles according to the operation of the piezoelectric element.

Meanwhile, the inkjet head unit 140 may independently adjust the jetting amount of the substrate processing liquid provided through each of the nozzles according to the voltage applied to the piezoelectric elements.

The substrate processing liquid supply unit 150 may supply ink to the inkjet head unit 140. The substrate processing liquid supply unit 150 may be configured to include a storage tank 150*a* and a pressure control module 150*b*.

The storage tank 150*a* may store the substrate processing liquid, and the pressure control module 150*b* may adjust an internal pressure of the storage tank 150*a*. The storage tank 150*a* may supply a suitable amount of substrate processing liquid to the inkjet head unit 140 based on the pressure provided by the pressure control module 150*b*.

The controller 160 may control the entire operation of each unit constituting the substrate treatment apparatus 100. For example, the controller 160 may control the operations of the air hole 112 and gripper of the process processing unit 110, the operation of the vision module 125 of the maintenance unit 120, the operation of the gantry unit 130, the operation of the inkjet head unit 140, and the operation of the pressure control module 150*b* of the substrate processing liquid supply unit 150 and the like.

The controller 160 may be implemented as a computer or a server, including a process controller, a control program, an input module, an output module (or a display module), a memory module, and the like. The process controller may include a microprocessor that executes a control function for each configuration constituting the substrate treatment apparatus 100, and the control program may be executed to perform various treatments of the substrate treatment apparatus 100 under the control of the process controller. The memory module may store programs to be executed to perform various treatments of the substrate treatment apparatus 100 according to a variety of data and treatment conditions, i.e., store treatment recipes.

The controller 160 may control the maintenance of the inkjet head unit 140. For example, the control unit 160 may calibrate a substrate processing liquid jetting position of each nozzle included in the inkjet head unit 140 based on the measurement result of the maintenance unit 120, or detect a defective nozzle (i.e., a nozzle that does not jet the substrate processing liquid) from among the plurality of nozzles and control a cleaning operation to be performed on the defective nozzle.

The nozzle inspection unit 200 may inspect the nozzles of the inkjet head unit 140 based on image data of the substrate G obtained by the vision module 125. Specifically, when the vision module 125 obtains the image data of the substrate G, the nozzle inspection unit 200 may process the image data and inspect the nozzles by comparing and analyzing the processed image data and reference data. To this end, the nozzle inspection unit 200 may be associated with the vision module 125, and may be implemented as a computer, including a process controller, a control program, an input module, an output module (or a display module), a memory module, and the like, as in the controller 160.

As described above, a large amount of defect data is required to recognize and classify defects of the nozzles installed on the inkjet head unit 140. In the present embodiment, the nozzle inspection unit 200 may improve the detection accuracy of a defective nozzle and generate a large amount of defect data to enable inspection of various types of nozzle defects. Hereinafter, the nozzle inspection unit 200 will be described in detail.

Figure 2:
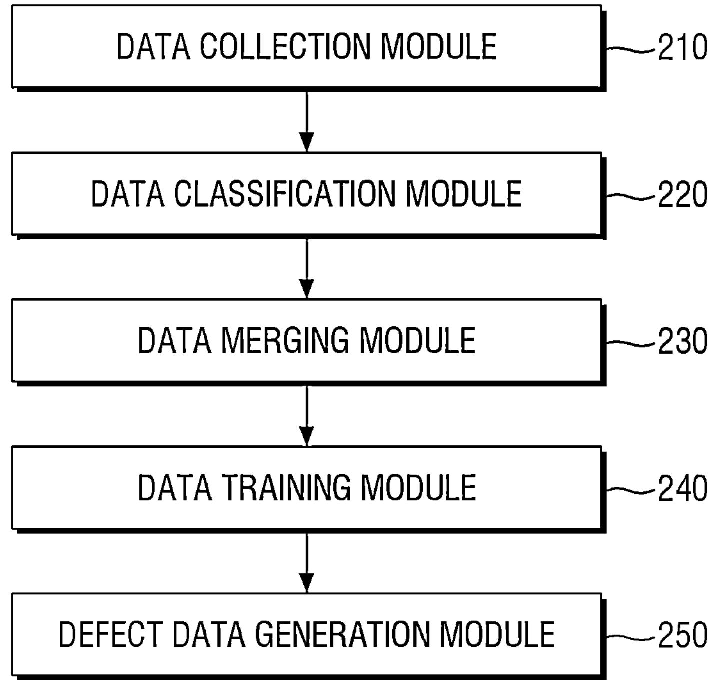
FIG. 2 is a first block diagram schematically illustrating internal modules related to a defect data generation method performed by a nozzle inspection unit included in a substrate treatment apparatus according to an embodiment of the present disclosure.

FIG. 2 is a first block diagram schematically illustrating internal modules related to a defect data generation method performed by a nozzle inspection unit included in a substrate treatment apparatus according to an embodiment of the present disclosure.

In the present embodiment, the nozzle inspection unit 200 related to a defect data generation method may be provided as a program created according to an algorithm. Alternatively, the nozzle inspection unit 200 may be provided as a microprocessor that loads and executes a program. Alternatively, the nozzle inspection unit 200 may be provided as a storage medium (e.g., solid state drive (SSD), hard disk drive (HDD), universal serial bus (USB) memory, etc.) that stores such a program. Alternatively, the nozzle inspection unit 200 may be provided as a computer or a server that includes a microprocessor and a memory and thus is capable of storing as well as executing such a program.

Referring to FIG. 2, the nozzle inspection unit 200 may be configured to include a data collection module 210, a data classification module 220, a data merging module 230, a data training module 240, and a defect data generation module 250.

The nozzle inspection unit 200 may generate a large amount of defect data related to the state of a nozzle. Specifically, the nozzle inspection unit 200 may generate a large amount of defect data using a generative adversarial network (GAN). More specifically, the nozzle inspection unit 200 may obtain a large amount of data by merging a small amount of defect data and good data, then generate fake defect data using the GAN, and finally generate a large amount of defect data.

The data collection module 210 collects a plurality of image data related to each nozzle installed on the inkjet head unit 140. In this case, the plurality of image data collected by the data collection module 210 are image data that the vision module 125 obtains by photographing the substrate G, and more specifically, may be image data obtained by photographing the substrate G onto which the substrate processing liquid (e.g., ink) is jetted by the nozzles of the inkjet head unit 140.

The data classification module 220 may classify the plurality of image data collected by the data collection module 210. The data classification module 220 may classify the plurality of image data according to predefined classes. In this case, the data classification module 220 may assign a label to each image data. The data classification module 220 may configure a label map for the plurality of image data using the labels assigned to each image data.

When the data classification module 220 classifies the plurality of image data according to the predefined classes, the data classification module 220 may classify image data of the substrate G onto which the substrate processing liquid is jetted by the nozzle with the same number into the same class, thereby classifying the plurality of image data. Alternatively, the data classification module 220 may classify image data of the substrate G onto which the substrate processing liquid is jetted by nozzles (e.g., nozzles which jet ink of the same color) included in the same pack into the same class, thereby classifying the plurality of image data. Alternatively, the data classification module 220 may classify image data of the substrate G onto which the substrate processing liquid is jetted by nozzles installed on the same inkjet head into the same class, thereby classifying the plurality of image data.

Figures 3, 4:
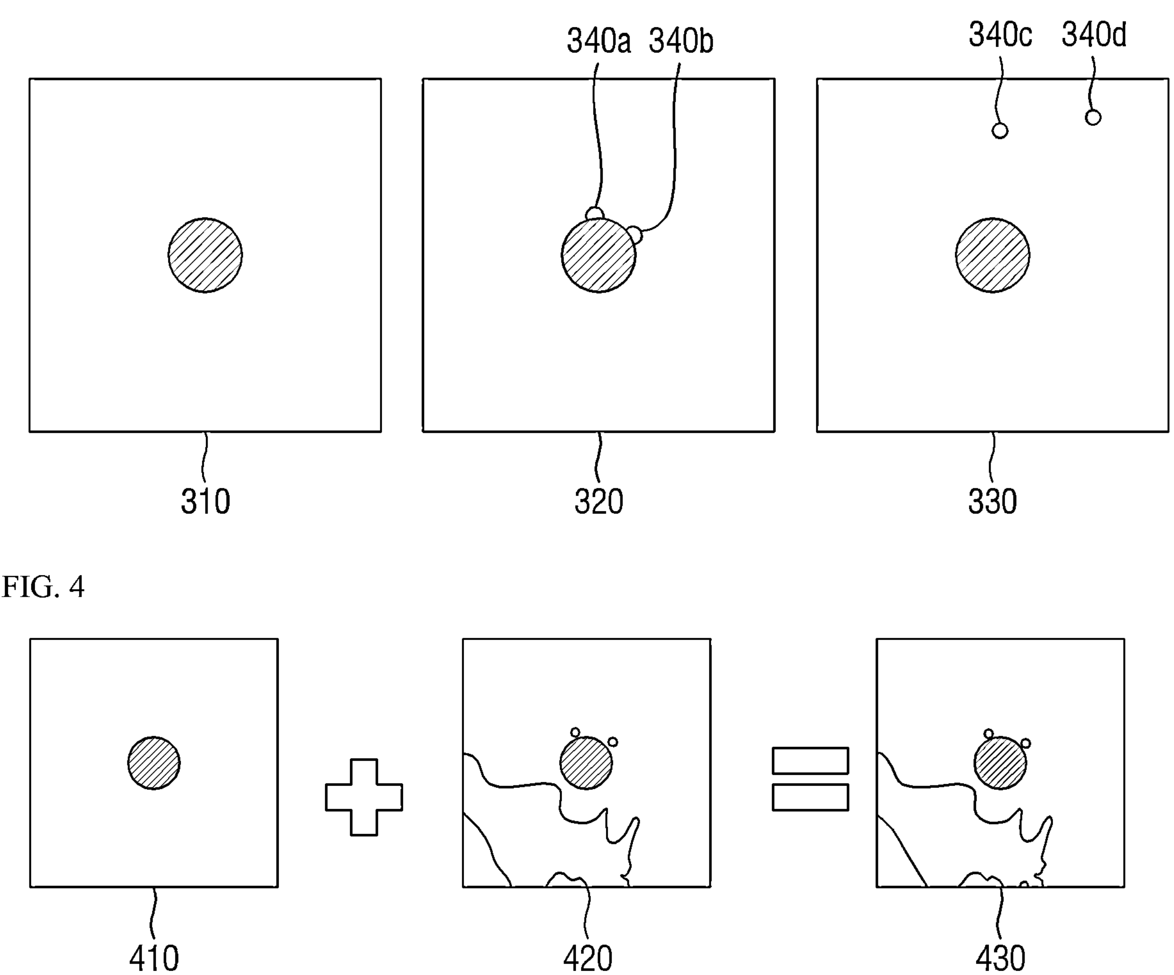
FIG. 3 is an exemplary diagram for explaining a function of a data classification module included in the nozzle inspection unit of FIG. 2.
FIG. 4 is a first exemplary diagram for explaining a function of a data merging module included in the nozzle inspection unit of FIG. 2.

The data classification module 220 may classify the plurality of image data into good image data and defect image data. For example, as shown in FIG. 3, when image data of the substrate G onto which the substrate processing liquid is jetted by the No. 1 nozzle of the inkjet head unit 140 is first image data 310, image data of the substrate G onto which the substrate processing liquid is jetted by the No. 2 nozzle of the inkjet head unit 140 is second image data 320, and image data of the substrate G onto which the substrate processing liquid is jetted by the No. 3 nozzle of the inkjet head unit 140 is third image data 330, the data classification module 220 may classify the first image data 310 having no area spots 340*a*, 340*b*, 340*c*, and 340*d* into good image data, and classify the second image data 320 having the area spots 340*a* and 340*b* and the third image data 330 having the area spots 340*c* and 340*d* into defect image data. FIG. 3 is an exemplary diagram for explaining a function of a data classification module included in the nozzle inspection unit of FIG. 2.

The following description will be made with reference back to FIG. 2.

When classifying the plurality of image data into good image data and defect image data, the data classification module 220 may classify the plurality of image data according to the predefined classes, and then classify the image data included in each class into good image data and defect image data. However, the present embodiment is not limited thereto. The data classification module 220 may classify the plurality of image data into good image data and defect image data, and then classify each of the good image data and the defect image data according to the predefined classes.

The data merging module 230 may merge the defect image data and the good image data to generate merged image data.

As described above, the data classification module 220 may classify the plurality of image data collected by the data collection module 210 into the good image data and the defect image data. In general, however, most of the plurality of image data is good image data, and there are only a few defect image data. Accordingly, in the present embodiment, a large quantity of merged image data containing defects may be generated by merging the defect image data with the good image data.

The data merging module 230 may simply merge M defect image data with N good image data to generate M*N merged image data. For example, the data merging module 230 may merge good image data 410 and defect image data 420 to generate first merged image data 430 as shown in FIG. 4. FIG. 4 is a first exemplary diagram for explaining a function of a data merging module included in the nozzle inspection unit of FIG. 2.

However, the present embodiment is not limited thereto. The data merging module 230 may further take into account a random rotation angle of image data when generating merged image data. For example, when merging M defect image data and N good image data, the data merging module 230 may further take into account L random rotation angles of image data, thereby generating L*M*N merged image data.

Figure 5:
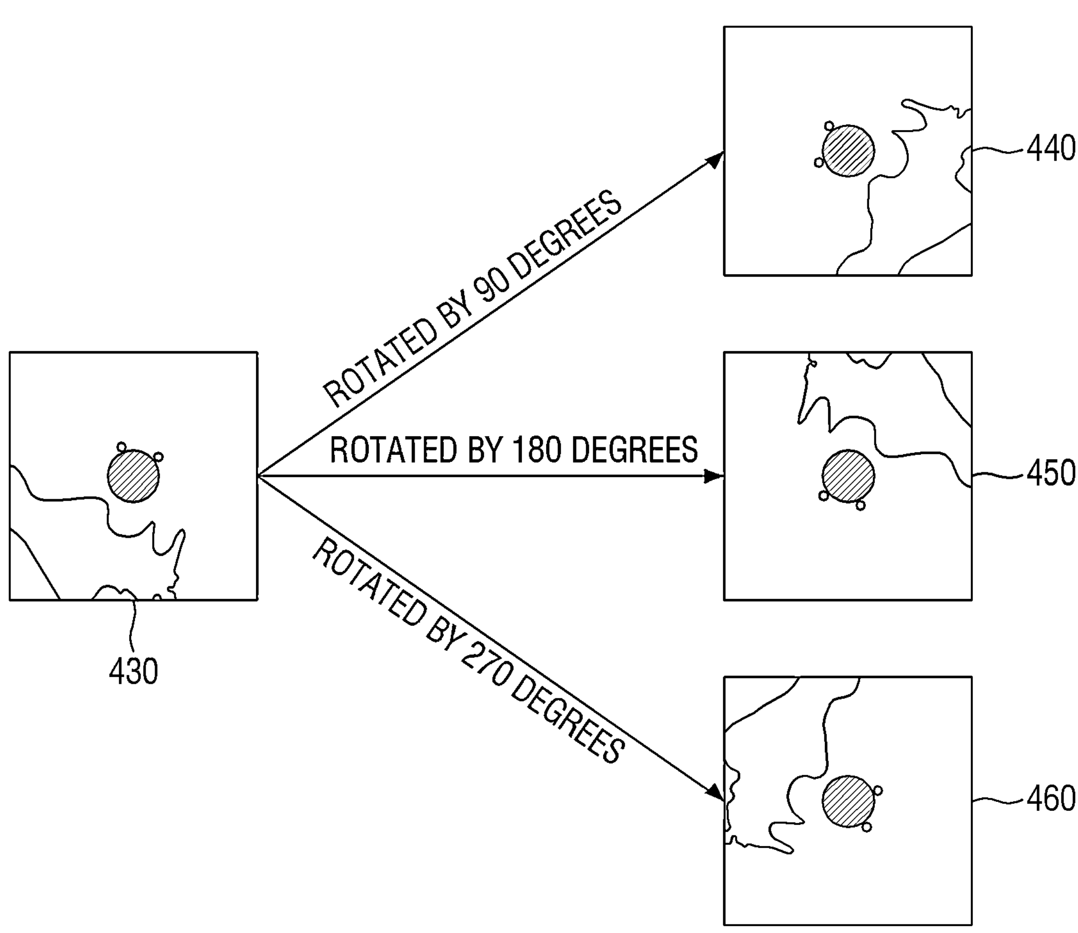
FIG. 5 is a second exemplary diagram for explaining a function of the data merging module included in the nozzle inspection unit of FIG. 2.

For example, the data merging module 230 may generate various types of merged image data including second merged image data 440, third merged image data 450, and fourth merged image data 460 from the first merged image data 430 by taking into account three random rotation angles as shown in FIG. 5. The second merged image data 440 is obtained by rotating the first merged image data 430 by 90 degrees, the third merged image data 450 is obtained by rotating the first merged data by 180 degrees, and the fourth merged image data 460 is obtained by rotating the first merged image data 430 by 270 degrees. FIG. 5 is a second exemplary diagram for explaining a function of the data merging module included in the nozzle inspection unit of FIG. 2.

When merging the defect image data and the good image data, the data merging module 230 may segment the good image data into regions, and then merge the defect image data into the good image data based on the segmented region. In this case, the data merging module 230 may rotate the defect image data by a predetermined angle based on the segmented region while maintaining the good image data during merging, and then merge the defect image data into the good image data while matching the centers of the segmented regions of the defect image data and the good image data. That is, the data merging module 230 may generate the merged image data by further taking into account a random rotation angle of the image data.

Meanwhile, the plurality of image data classified by the data classification module 220 may all be good image data. In other words, the data collection module 210 may collect good image data only.

In this case, the data merging module 230 may not be provided with the defect image data from the data classification module 220, but may separately obtain the defect image data. This will be described below.

Figure 6:
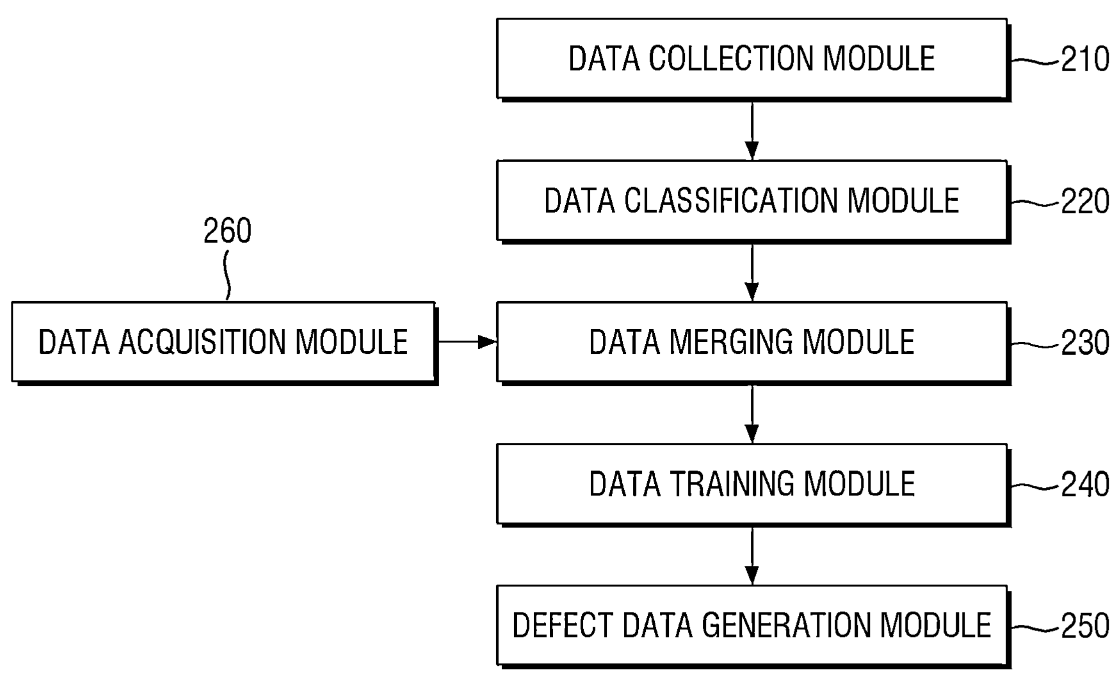
FIG. 6 is a second block diagram schematically illustrating internal modules related to a defect data generation method performed by a nozzle inspection unit included in a substrate treatment apparatus according to an embodiment of the present disclosure.

FIG. 6 is a second block diagram schematically illustrating internal modules related to a defect data generation method performed by a nozzle inspection unit included in a substrate treatment apparatus according to an embodiment of the present disclosure.

Referring to FIG. 6, a nozzle inspection unit 200 may include a data collection module 210, a data classification module 220, a data merging module 230, a data training module 240, a defect data generation module 250, and a data acquisition module 260.

Since the data collection module 210, the data classification module 220, and the data merging module 230 are described above with reference to FIG. 2, the detailed descriptions thereof will be hereinafter omitted. In addition, the data training module 240 and the defect data generation module 250 will be described further below with reference to FIG. 2, and hence detailed descriptions thereof will be omitted in the following description.

The data acquisition module 260 acquires defect image data related to the image data of the substrate G. Specifically, the data acquisition module 260 may acquire defect image data related to the image data of the substrate G onto which the substrate processing liquid is jetted by nozzles. The data acquisition module 260 may provide the acquired defect image data to the data merging module 230.

The data acquisition module 260 may acquire at least one defect image data that enables determination of a defective nozzle. The data acquisition module 260 may receive the defect image data through an input means, such as a keyboard, a mouse, a touch screen, or the like, and may receive the defect image data through a communication means, such as a Wi-Fi network, a local area network (LAN), or the like.

The following description will be made with reference back to FIG. 2.

The data training module 240 may train the merged image data obtained by the data merging module 230. In the case of the merged image data, it is obtained as a result of rotating simple defect image data and thus may have a disadvantage in that characteristics may be repeated. In the present embodiment, in order to resolve such a disadvantage, the data training module 240 may train the merged image data using a GAN.

When the merged image data is trained using the GAN, the data training module 240 may be able to acquire fake image data in which some content (e.g., defect part) is similar to the merged image data, on the basis of noise vector. Accordingly, in the present embodiment, by removing the fake image data from the merged image data obtained through the data merging module 230, it is possible to reduce duplicated characteristics caused by a small amount of the defect image data.

The defect data generation module 250 may finally generate a large amount of defect image data. Specifically, the defect data generation module 250 may remove the fake image data from the large amount of merged image data (i.e., a large amount of the merged image data including the defect image data) obtained through image data merging, and generate the remaining merged image data as final defect image data.

The internal modules of the nozzle inspection unit 200 related to the defect data generation method have been described above with reference to FIGS. 2 to 6. Hereinafter, the defect data generation method performed by these internal modules will be described.

Figure 7:
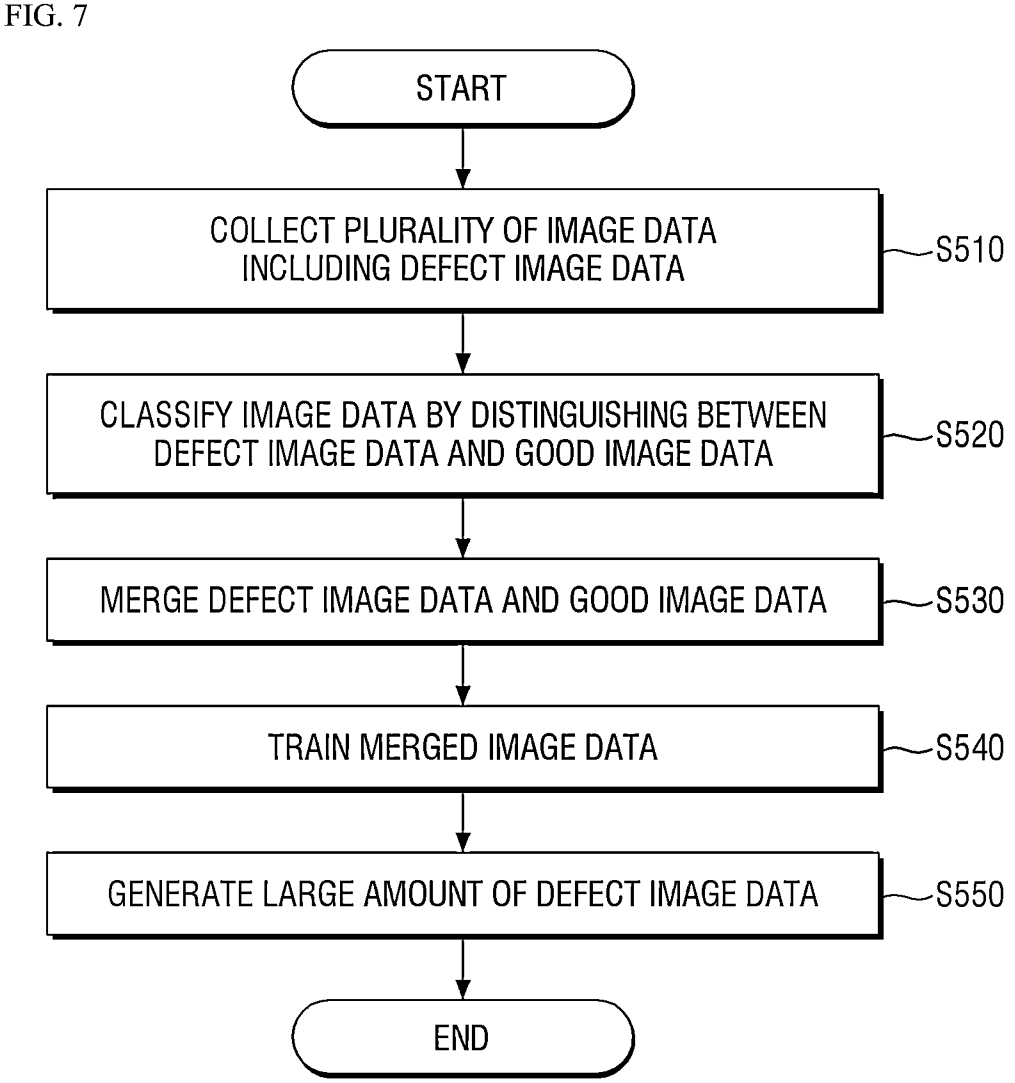
FIG. 7 is a first flowchart illustrating a defect data generation method performed by a nozzle inspection unit included in a substrate treatment apparatus according to an embodiment of the present disclosure.

FIG. 7 is a first flowchart illustrating a defect data generation method performed by a nozzle inspection unit included in a substrate treatment apparatus according to an embodiment of the present disclosure. The following description will be made with reference to FIGS. 2 and 7.

First, the data collection module 210 collects a plurality of image data related to each nozzle in S510.

Then, the data classification module 220 classifies the plurality of image data collected by the data collection module 210 in S520. The data classification module 220 may classify the plurality of image data according to predefined classes and may classify the plurality of image data into good image data and defect image data. When the plurality of image data consist of only good image data (i.e., the plurality of image data do not include defect image data), the data classification module 220 may not classify the plurality of image data into good image data and defect image data.

Thereafter, the data merging module 230 may generate merged image data by merging the defect image data and the good image data in S530. When generating merged image data, the data merging module 230 may generate M*N merged image data by merging M defect image data and N good image data, and may generate L*M*N merged image data by further taking into account L random rotation angles of image data.

Then, the data training module 240 trains the merged image data obtained by the data merging module 230 in S540. In this case, the data training module 240 may train the merged image data using a GAN, thereby obtaining fake image data that is similar to the merged image data.

Then, the defect data generation module 250 finally generate a large amount of defect image data in S550. The defect data generation module 250 may remove the fake image data obtained by the data training module 240 from the large amount of merged image data obtained through merging by the data merging module 230, thereby generating the remaining merged image data as final defect image data. Accordingly, in the present disclosure, duplicated characteristics of a small amount of duplicated image data can be reduced.

Meanwhile, when the plurality of image data provided by the data classification module 220 are all be good image data, the data merging module 230 may separately obtain defect image data.

Figure 8:
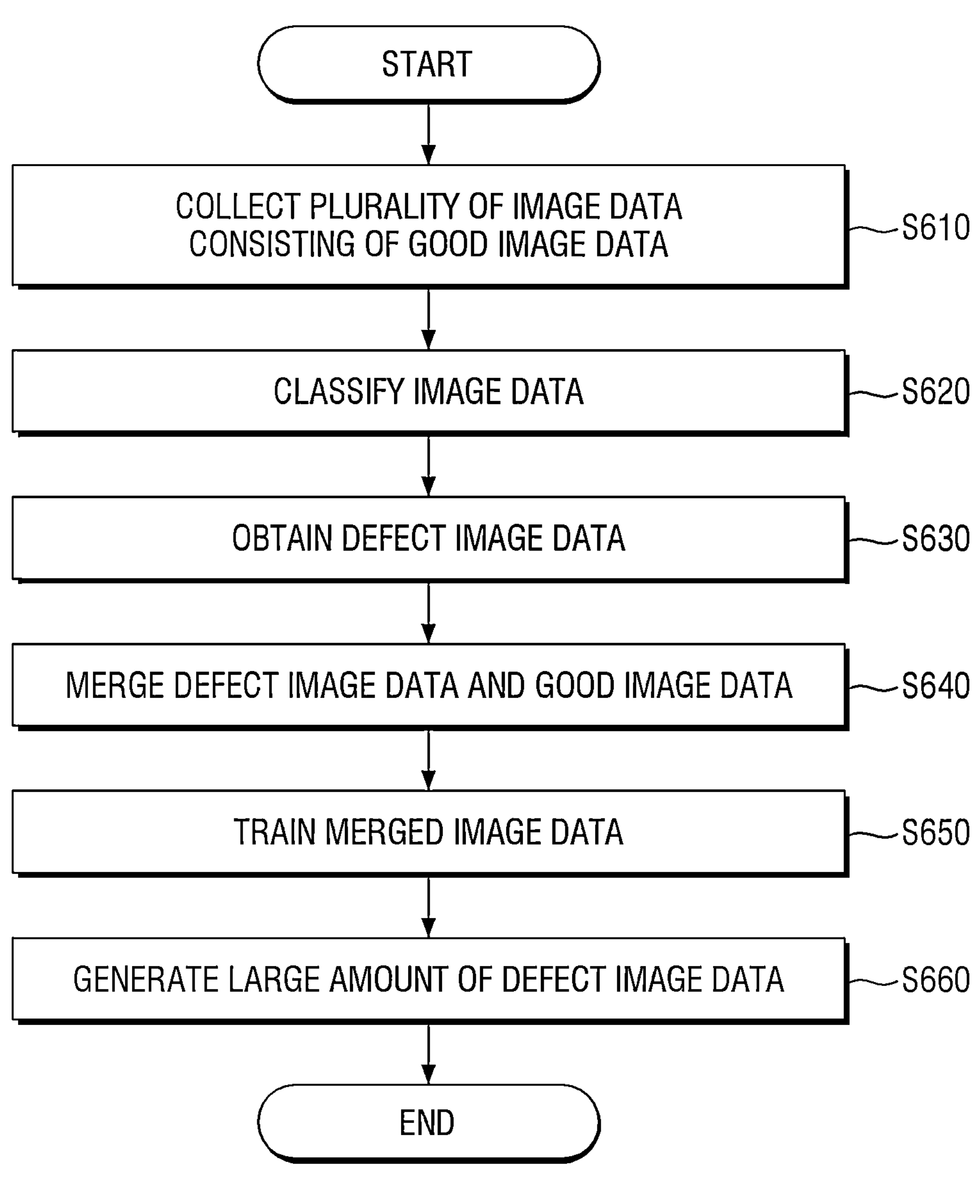
FIG. 8 is a second flowchart illustrating a defect data generation method performed by a nozzle inspection unit included in a substrate treatment apparatus according to an embodiment of the present disclosure.

FIG. 8 is a second flowchart illustrating a defect data generation method performed by a nozzle inspection unit included in a substrate treatment apparatus according to an embodiment of the present disclosure. Hereinafter, a description will be made with reference to FIGS. 6 and 8.

First, the data collection module 210 collects a plurality of image data related to each nozzle in S610.

Then, the data classification module 220 classifies the plurality of image data collected by the data collection module 210 in S620. The data classification module 220 may classify the plurality of image data according to predefined classes.

Then, the data acquisition module 260 acquires defect image data related to the image data of the substrate G and provides the same to the data merging module 230 in S630. The data acquisition module 260 may receive defect image data through an input means, or may receive defect image data through a communication means.

Operation S630 may be performed before operation S640. In this case, operation S630 may be performed after operation S620, but the present embodiment is not limited thereto. For example, operation S630 may be performed simultaneously with operation S620. Alternatively, operation S630 may be performed between operations S610 and S620. Alternatively, operation S630 may be performed simultaneously with operation S610. Alternatively, operation S630 may be performed before operation S610.

Thereafter, the data merging module 230 generates merged image data by merging the defect image data and good image data in S640.

Then, the data training module 240 trains the merged image data obtained by the data merging module 230 in S650.

Then, the defect data generation module 250 finally generate a large amount of defect image data by removing fake image data obtained by the data training module 240 from a large amount of merged image data obtained through merging by the data merging module 230 in S660.

The defect data generation method performed by the nozzle inspection unit 200 has been described above with reference to FIGS. 2 and 8. Hereinafter, a nozzle inspection method performed by the nozzle inspection unit 200 using image data will be described.

Figure 9:
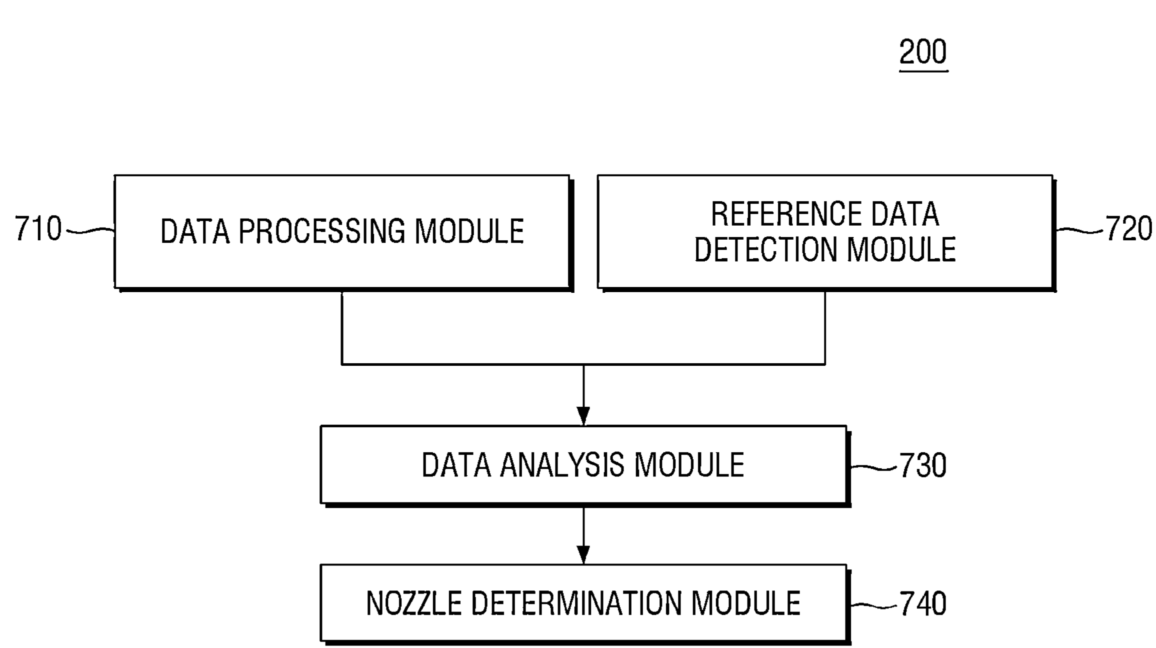
FIG. 9 is a block diagram schematically illustrating internal modules related to a nozzle inspection method performed by a nozzle inspection unit included in a substrate treatment apparatus according to an embodiment of the present disclosure.
Figure 10:
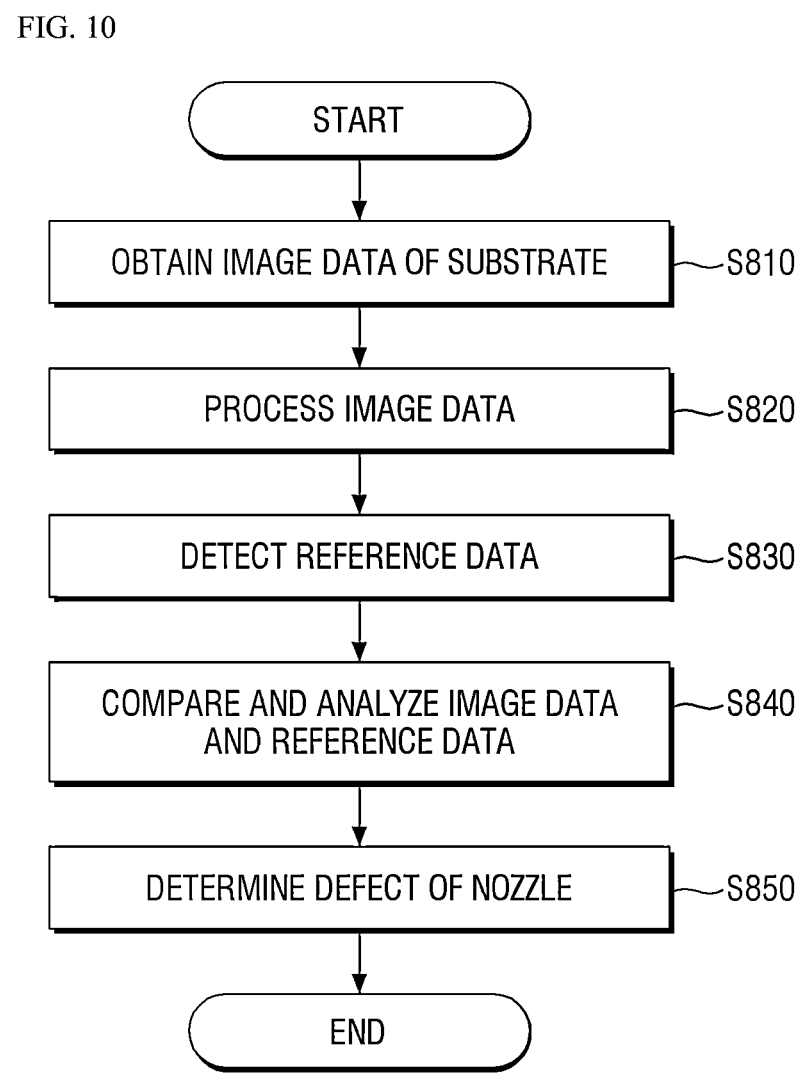

FIG. 9 is a block diagram schematically illustrating internal modules related to a nozzle inspection method performed by a nozzle inspection unit included in a substrate treatment apparatus according to an embodiment of the present disclosure. FIG. 10 is a flowchart illustrating a nozzle inspection method performed by a nozzle inspection unit included in a substrate treatment apparatus according to an embodiment of the present disclosure. Hereinafter, a description will be made with reference to FIGS. 9 and 10.

First, when the vision module 125 obtains image data of a substrate G in S810, a data processing module 710 of the nozzle inspection unit 200 processes the image data in S820. Here, the image data of the substrate G obtained by the vision module 125 may be image data of the substrate G onto which a substrate processing liquid is jetted by a nozzle of the inkjet head unit 140.

Then, a reference data detection module 720 of the nozzle inspection unit 200 detects reference data to be compared with the image data of the substrate G from among a plurality of defect image data generated according to a defect data generation method in S830. The reference data detection module 720 may determine a class related to the image data of the substrate G from among predefined classes and then detect the reference data from among defect image data determined to be of the corresponding class.

Operation S830 may be performed after operation S820, but may be performed simultaneously with operation S820. Also, operation 5830 may be performed before operation S820. Meanwhile, in the present embodiment, before performing operation 5830, a defect data generation method may be performed and then operation S830 may be performed.

Thereafter, a data analysis module 730 of the nozzle inspection unit 200 compares and analyzes the image data of the substrate G and the reference data in S840.

Then, in S850, a nozzle determination module 740 of the nozzle inspection unit 200 determines whether the nozzle is in a good condition or defective based on the comparison and analysis results. For example, in the case where pixel printing is performed on the substrate G, when it is determined that a line defect or area spot caused by an impact error does not exist on the substrate G, the nozzle determination module 740 may determine that the nozzle is in a good condition. When it is determined that the line defect or area spot exists on the substrate G, the nozzle determination module 740 may determine that the nozzle is defective.

The present disclosure relates to a defect data generation method using a GAN, which is applicable to the inspection of nozzles of inkjet equipment including an inkjet head unit 140.

In order to measure and classify defects related to a state of a nozzle, a large quantity of defect data is required. However, it is difficult to obtain a large amount of defect data since the defect data less frequently occur and is difficult to confirm as compared to normal nozzle data. In the present embodiment, a large amount of defect data may be obtained by merging a large amount of normal data and a small amount of defect data, fake defect data may be generated through a GAN in order to reduce duplicated characteristics of the small amount of defect data, and defect data modified through the fake defect data may be acquired.

The present embodiment may achieve the above purposes through the following procedures. First, a label map of data of an image dataset is generated such that nozzle information can be segmented from normal data. Then, normal nozzle data is segmented from the image dataset, and then defect data is merged into the normal data on the basis of a segmented region. The defect data is rotated by a random angle based on the segmented region while maintaining the normal data during merging, and the defect data and the normal data are merged while matching the centers of the segmented regions of the defect data and the normal data. In addition, when the number of normal data, the number of defect data, and the number of random rotation angles are defined as M, N, and L, respectively, M*N*L merged data may be created. The merged image is obtained by rotating simple defect image data and thus has a disadvantage in that characteristics are repeated. Thus, in order to resolve such a drawback, a GNA is trained based on the merged data to obtain fake defect images similar to the merged data, i.e., obtain fake images. Finally, a large amount of defect dataset is obtained through the fake defect images.

While various embodiments have been described, those skilled in the art will appreciate that many variations and modifications can be made to the preferred embodiments without substantially departing from the principles of the present disclosure. Therefore, the disclosed preferred embodiments of the invention are used in a generic and descriptive sense only and not for purposes of limitation.

What is claimed:

1. A nozzle inspection unit comprising:

a controller configured to:

collect a plurality of image data related to nozzles;

classify the plurality of image data according to predefined classes;

generating, after classifying the plurality of image data, a plurality of merged image data by:

first merging a first number of good image data related to a normal nozzle from among the plurality of image data with a second number of defect image data related to a defective nozzle from among the plurality of image data to obtain a first merged image data of the plurality of merged image data, the second number being smaller than the first number; and generating remaining ones of the plurality of merged image data besides the first merged image data by duplicating and rotating the first merged image data at a third number of random rotation angles such that each of the remaining ones of the plurality of merged image data besides the first merged image data is the first merged image data rotated at one of the third number of random rotation angles;

train the plurality of merged image data after the plurality of merged image data is generated; and generate a plurality of final image data from the plurality of merged image data based on a training result of the training of the plurality of merged image data.

2. The nozzle inspection unit of claim 1, wherein the final image data is image data related to a defect of the nozzle.

3. The nozzle inspection unit of claim 2, wherein the controller is configured to generate a number of the final image data greater than a reference number from a number of the defect image data smaller than the reference number.

4. The nozzle inspection unit of claim 1, wherein the controller is configured to obtain fake image data similar to the merged image data by training the merged image data.

5. The nozzle inspection unit of 4, wherein the controller is configured to obtain the fake image data using a generative adversarial network (GAN).

6. The nozzle inspection unit of claim 1, wherein the controller is configured to remove fake image data similar to the merged image data from the plurality of merged image data and generate the final image data based on the remaining merged image data.

7. The nozzle inspection unit of claim 1, wherein the controller is configured to segment the good image data into regions and then merge the defect image data into the good image data based on the segmented region.

8. The nozzle inspection unit of claim 1, wherein the plurality of image data include the good image data and the defect image data or include the good image data only.

9. The nozzle inspection unit of claim 1, wherein the controller is configured to classify the plurality of image data into the good image data and the defect image data.

10. The nozzle inspection unit of claim 9, wherein the controller is configured to classify the plurality of image data according to the classes and then classify the image data included in each of the classes into the good image data and the defect image data, or to classify the plurality of image data into the normal image data and the defect image data and then classify each of the normal image data and the defect image data according to the classes.

11. The nozzle inspection unit of claim 1, wherein the controller is further configured to, when the plurality of image data include only the normal image data, provide the defect image data.

12. The nozzle inspection unit of claim 1, wherein the controller is configured to utilize the final image data in determining a defect of the nozzle.

13. The nozzle inspection unit of claim 1, wherein the controller is further configured to:

when the image data of the substrate is obtained, process the image data of the substrate;

detect reference data;

compare and analyze the image data of the substrate and the reference data; and determine whether the nozzle is in a good condition or defective based on the analysis between the image data of the substrate and the reference data.

14. The nozzle inspection unit of claim 13, wherein the controller is further configured to determine a class related to the image data of the substrate from among the predefined classes and detect the reference data from among training data included in the determined class.

15. The nozzle inspection unit of claim 1, wherein, during the generating of the remaining ones of the plurality of merged image data besides the first merged image data, the controller is further configured to only rotate one or more content making a duplicated one the first merged image data at the third number of random rotation angles instead of an entirety of the duplicated one of the first merged image data at the third number of random rotation angles, the one or more content containing only one or more defects identified in the second number of defect image data.

16. The nozzle inspection unit of claim 1, wherein the plurality of image data is collected by photographing substrates that are currently being treated on a substrate treatment apparatus containing the nozzle inspection unit, the controller only generates the plurality of merged image data using the second number of the defect image data related to the defective nozzle if the plurality of image data that is collected contains the defect image data related to the defective nozzle, and in an instance where the plurality of image data that is collected only contains the good image data related to the normal nozzle, the controller is further configured to collect supplemental defect image data related to the defective nozzle from a source different from and external to the substrate treatment apparatus, the supplemental defect image date not being associated with the substrates that are currently being treated on the substrate treatment apparatus.

17. A nozzle inspection unit comprising:

a controller configured to:

collect a plurality of image data related to nozzles;

classify the plurality of image data according to predefined classes;

generating, after classifying the plurality of image data, a plurality of merged image data by:

first merging a first number of good image data related to a normal nozzle from among the plurality of image data with a second number of defect image data related to a defective nozzle from among the plurality of image data to obtain a first merged image data of the plurality of merged image data, the second number being smaller than the first number; and generating remaining ones of the plurality of merged image data besides the first merged image data by duplicating and rotating the first merged image data at a third number of random rotation angles such that each of the remaining ones of the plurality of merged image data besides the first merged image data is the first merged image data rotated at one of the third number of random rotation angles;

train the plurality of merged image data after the plurality of merged image data is generated; and generate a plurality of final image data from the plurality of merged image data based on a training result of the training of the plurality of merged image data, wherein the controller is further configured to:

generate a number of the final image data greater than a reference number from a number of the defect image data smaller than the reference number, obtain fake image data similar to the merged image data by training the merged image data, wherein the controller obtains the fake image data using a GAN, and remove the fake image data similar to the merged image data from the plurality of merged image data and generates the final image data based on the remaining merged image data.

18. A substrate treatment apparatus comprising:

a support configured to support a substrate while the substrate is treated;

an inkjet head unit including a plurality of nozzles and configured to jet a substrate processing liquid onto the substrate using the nozzles;

a gantry unit having the inkjet head unit installed thereon and configured to move the inkjet head unit on the substrate; and a controller configured to inspect the nozzles, wherein the controller is configured to:

collect a plurality of image data related to the nozzles;

classify the plurality of image data according to predefined classes;

generating, after classifying the plurality of image data, a plurality of merged image data by:

first merging a first number of good image data related to a normal nozzle from among the plurality of image data with a second number of defect image data related to a defective nozzle from among the plurality of image data to obtain a first merged image data of the plurality of merged image data, the second number being smaller than the first number; and generating remaining ones of the plurality of merged image data besides the first merged image data by duplicating and rotating the first merged image data at a third number of random rotation angles such that each of the remaining ones of the plurality of merged image data besides the first merged image data is the first merged image data rotated at one of the third number of random rotation angles;

train plurality of merged image data after the plurality of merged image data is generated; and generate a plurality of final image data from the plurality of merged image data based on the training result.

19. The substrate treatment apparatus of claim 18, wherein the substrate treatment apparatus is configured to perform pixel printing on the substrate.

* * * * *